(12) United States Patent
Yamada et al.

(10) Patent No.: US 11,740,365 B2
(45) Date of Patent: Aug. 29, 2023

(54) POSITIONAL ERROR PREDICTION DEVICE, PREDICTION MODEL GENERATION DEVICE, POSITIONAL ERROR PREDICTION METHOD, PREDICTION MODEL GENERATION METHOD, AND PROGRAM

(71) Applicant: MITSUBISHI HEAVY INDUSTRIES MACHINERY SYSTEMS, LTD., Hyogo (JP)

(72) Inventors: Masahiro Yamada, Tokyo (JP); Kenji Takao, Tokyo (JP); Takeshi Korenaga, Tokyo (JP)

(73) Assignee: MITSUBISHI HEAVY INDUSTRIES MACHINERY SYSTEMS, LTD., Hyogo (JP)

( * ) Notice: Subject to any disclaimer, the term of this patent is extended or adjusted under 35 U.S.C. 154(b) by 162 days.

(21) Appl. No.: 16/970,405

(22) PCT Filed: Feb. 19, 2018

(86) PCT No.: PCT/JP2018/005698
§ 371 (c)(1),
(2) Date: Aug. 17, 2020

(87) PCT Pub. No.: WO2019/159353
PCT Pub. Date: Aug. 22, 2019

(65) Prior Publication Data
US 2021/0109233 A1     Apr. 15, 2021

(51) Int. Cl.
*G01S 19/39*    (2010.01)
*G01S 19/22*    (2010.01)
(Continued)

(52) U.S. Cl.
CPC ............ *G01S 19/396* (2019.08); *G01S 19/22* (2013.01); *G01S 19/25* (2013.01); *G01S 19/31* (2013.01); *G01S 19/51* (2013.01)

(58) Field of Classification Search
CPC ........ G01S 19/396; G01S 19/22; G01S 19/25; G01S 19/31; G01S 19/51
(Continued)

(56) References Cited

U.S. PATENT DOCUMENTS 6,166,684 A * 12/2000 Yoshikawa ........... G01S 5/0072
                                                         342/357.34
6,420,999 B1    7/2002 Vayanos
(Continued)

FOREIGN PATENT DOCUMENTS

JP         3869108 B      1/2007
JP         4550872 B2     9/2010

OTHER PUBLICATIONS

International Search Report and Written Opinion of International Application No. PCT/JP2018/005698 dated Mar. 20, 2018; 11pp.

*Primary Examiner* — Bo Fan
(74) *Attorney, Agent, or Firm* — KANESAKA BERNER AND PARTNERS LLP

(57) ABSTRACT

This positional error prediction device (1) is provided with: a satellite position acquisition unit (154) which acquires a receivable position of a satellite on a target date at a target time and a target point at which a positional error prediction is performed; a relative relationship value acquisition unit (151) which acquires a value of the relative relationship between the position of the satellite and an observation start position of the satellite at the target point; and an error prediction unit (155) which predicts, on the basis of the relative relationship value and a positional error prediction
(Continued)

model generated in advance, a positional error on the target date at the target time and the target point.

12 Claims, 12 Drawing Sheets

(51) Int. Cl.
  *G01S 19/25* (2010.01)
  *G01S 19/31* (2010.01)
  *G01S 19/51* (2010.01)

(58) Field of Classification Search
  USPC .... 342/357.31, 352, 357.44, 357.62, 357.66, 342/357.49
  See application file for complete search history.

(56) References Cited

U.S. PATENT DOCUMENTS

| | | | |
|---|---|---|---|
| 10,802,152 B2* | 10/2020 | Saito | G01S 19/426 |
| 2006/0017611 A1* | 1/2006 | Hatch | G01S 5/0045 |
| | | | 342/357.31 |

* cited by examiner

FIG. 5

<REFERENCE POINT INFORMATION> N1

| P1 REFERENCE POINT | | | | |
|---|---|---|---|---|
| OBSERVABLE SATELLITE | G1 | G2 | G3 | G4 |
| OBSERVATION START POSITION | G1b | G2a | G3c | G4b |

POSITIONAL ERROR PREDICTION DEVICE, PREDICTION MODEL GENERATION DEVICE, POSITIONAL ERROR PREDICTION METHOD, PREDICTION MODEL GENERATION METHOD, AND PROGRAM

RELATED APPLICATIONS

The present application is a National Phase of International Application Number PCT/JP2018/005698 filed Feb. 19, 2018.

TECHNICAL FIELD

The present invention relates to a positional error prediction device, a prediction model generation device, a positional error prediction method, a prediction model generation method, and a program.

BACKGROUND ART

In recent years, as a technique for specifying the position of a vehicle or the like, a satellite positioning system for specifying (positioning) the position of a receiver is widely used, by using a satellite that constitutes a Global Navigation Satellite System (GLASS) and a receiver that receives a signal from the satellite.

The satellite positioning system obtains a distance (pseudo distance) between the receiver and each of the plurality of satellites, from the signal received by the receiver, and specifies the position of the receiver based on these pseudo distances, but various factors are known to cause positional errors. Predicting how much positional error will occur is important for improving positioning accuracy.

For example, arrangements of respective satellites from which signals can be received by the receiver affect positional errors. Therefore, as a technique for predicting the positional error, a precision deterioration rate (hereinafter also referred to as "Dilution of Precision (DOP)") that represents a geometrical positional error that differs depending on the satellite arrangement is generally used.

Further, for example, PTL 1 describes a technique for predicting a positional error based on the inclination angle of a traveling road, the turning radius of the vehicle, the weight of the vehicle, and the speed of the vehicle.

CITATION LIST

Patent Literature

[PTL 1] Japanese Patent No. 3869108

SUMMARY OF INVENTION

Technical Problem

One of the factors that greatly affect the positional error is "multipath" in which the receiver receives a signal (reflected wave) reflected by a shield such as a high-rise building.

However, in the related art, it is premised that the receiver directly receives the signal from the satellite, and means for predicting the positional error due to multipath has not been considered.

Solution to Problem

In order to solve the above problems, the present invention employs the following means.

According to a first aspect of the present invention, a positional error prediction device (1) includes a satellite position acquisition unit (154) that acquires a position of a satellite from which a signal can be received at target date and time on a target point at which a positional error prediction is performed, a relative relationship value acquisition unit (151) that acquires a relative relationship value between the position of the satellite and an observation start position of the satellite at the target point, and an error prediction unit (155) that predicts a positional error at the target date and time on the target point, based on the relative relationship value and a positional error prediction model generated in advance.

For example, when there is shield such as a building around the target point, the positional error prediction device is able to receive a signal from the satellite, when the satellite reaches a position (that is, the observation start position) where the satellite is not completely shielded by the shield. However, in the vicinity of the observation start position, there is a possibility that a multipath may occur in which a reflected wave in which the signal from the satellite is reflected on a shield is received. Therefore, the positional error prediction device according to the above-described aspect predicts the positional error based on the relative relationship value between the position of the satellite and the observation start position of the satellite. Thus, the positional error prediction device can predict the positional error with the influence of multipath taken into consideration. Here, as the observation start position, a position may be set in which when the satellite is observed at the same date or multiple dates, the satellite switches from the unobservable state to the observable state at a certain rate (frequency). Further, as the observation start position, at a point where the positional error is predicted, a position separated from the boundary of the shield in an above-captured image by a predetermined distance may be set.

According to the second aspect of the present invention, in the positional error prediction device (1) according to the first aspect, the relative relationship value acquisition unit (151) acquires, as the relative relationship value, the number of the satellites located within a predetermined distance threshold from the observation start position of each of the plurality of satellites, By doing so, the positional error prediction device can predict the positional error with the influence of multipath near the observation start position taken into consideration, based on the number of satellites located within the predetermined distance threshold from the observation start position.

According to a third aspect of the present invention, in the positional error prediction device (1) according to the first aspect, the relative relationship value acquisition unit (151) acquires, as the relative relationship value, a separation distance from the observation start position with respect to the satellite closest to the observation start position, among the plurality of satellites.

By doing so, the positional error prediction device can predict the positional error with the influence of multipath near the observation start position taken into consideration, based on the separation distance from the observation start position.

According to a fourth aspect of the present invention, a prediction model generation device (10) includes an observation start position specifying unit (150) that specifies an observation start position of a satellite from which a signal can be received at a reference point, a relative relationship value acquisition unit (151) that acquires a relative relationship value between a position of the satellite and the observation start position of the satellite, an error measurement unit (152) that measures a positional error at the reference point, and a prediction model generation unit (153) that generates a prediction model used for prediction of a positional error at a certain point, based on the relative relationship value and the positional error.

By doing so, the prediction model generation device can generate a positional error prediction model with the influence of multipath near the observation start position taken into consideration.

According to a fifth aspect of the present invention, in the prediction model generation device (10) according to the fourth aspect, the relative relationship value acquisition unit (151) acquires, as the relative relationship value, the number of the satellites located within a predetermined distance threshold from the observation start position of each of the plurality of satellites, and the prediction model generation unit generates, as the prediction model, a correlation function between the number of the satellites and the positional error.

By doing so, the prediction model generation device can a positional error prediction model with the influence of multipath near the observation start position taken into consideration, based on the number of satellites located within the predetermined distance threshold from the observation start position. Thereby, the prediction model generation device can improve the prediction accuracy of the positional error.

According to a sixth aspect of the present invention, the prediction model generation device (10) according to the fifth aspect further includes a threshold setting unit (156) that sets, as the distance threshold, a distance at which the correlation function having a smallest residual variation is obtained, among the distances of the plurality of satellites from the observation start position.

By doing so, the prediction model generation device (10) generates a prediction model by setting the distance threshold that makes the correlation between the positional error and the number of satellites strong, thereby further improving the prediction accuracy of the positional error.

According to a seventh aspect of the present invention, the prediction model generation device (10) according to the fifth aspect further includes a threshold setting unit (156) that measures a pseudo distance between the reference point and the satellite, and sets, as the distance threshold for each satellite, a distance from the observation start position of the satellite to the position of the satellite when the pseudo distance has changed by a predetermined amount or more.

By doing so, the prediction model generation device can determine how far multipath affects from the observation start position, for each satellite, based on the change in the pseudo distance, and set the distance threshold. Thereby, the prediction model generation device can further improve the prediction accuracy of the positional error.

According to an eighth aspect of the present invention, in the prediction model generation device (10) according to the fourth aspect, the relative relationship value acquisition unit (151) acquires, as the relative relationship value, a separation distance of each of the plurality of satellites from the observation start position of the satellite closest to the observation start position, and the prediction model generation unit (153) generates the prediction model indicating a correlation between the separation distance and the positional error.

By doing so, the prediction model generation device can generate a positional error prediction model with the influence of multipath near the observation start position taken into consideration, based on the separation distance from the observation start position. Thereby, the prediction model generation device can improve the prediction accuracy of the positional error.

According to a ninth aspect of the present invention, the prediction model generation device (10) according to the eighth aspect further includes a threshold setting unit (156) that sets, as a distance threshold, a separation distance which is smallest among the separation distances having the positional error being equal to or less than a predetermined error threshold, and the prediction model generation unit (153) generates, as the prediction model, a correlation function between the separation distance that is equal to or less than the distance threshold and the maximum value of the positional error measured when the distance is equal to or less than the distance threshold.

By doing so, the prediction model generation device can derive how far multipath affects from the observation start position, based on the correlation between the positional error and the separation distance, and set a distance threshold. Further, it is possible to accurately predict the maximum positional error that will occur in the region where the influence of multipath may occur, by generating, as a prediction model, a correlation function with the maximum value of the positional error measured when the distance is equal to or less than the distance threshold.

According to a tenth aspect of the present invention, a positional error prediction method includes a satellite position acquisition step of acquiring a position of a satellite from which a signal can be received at target date and time on a target point at which a positional error prediction is performed, a relative relationship value acquisition step of acquiring a relative relationship value between the position of the satellite and an observation start position of the satellite at the target point, and an error prediction step of predicting, based on the relative relationship value and a positional error prediction model generated in advance, a positional error at the target date and time on the target point.

According to an eleventh aspect of the present invention, a prediction model generation method includes an observation start position specifying step of specifying an observation start position of a satellite from which a signal can be received at a reference point, a relative relationship value acquisition unit step of acquiring a relative relationship value between a position of the satellite and the observation start position of the satellite, an error measurement step of measuring a positional error at the reference point, and a prediction model generation step of generating a prediction model used for prediction of a positional error at a certain point, based on the relative relationship value and the positional error.

According to a twelfth aspect of the present invention, a program causing a computer of a positional error prediction device (1) to function, the program causing the computer to execute: a positional error prediction method includes a satellite position acquisition step of acquiring a position of a satellite from which a signal can be received at target date and time on a target point at which a positional error prediction is performed, a relative relationship value acquisition step of acquiring a relative relationship value between the position of the satellite and an observation start position of the satellite at the target point, and an error prediction step of predicting, based on the relative relationship value and a positional error prediction model generated in advance, a positional error at the target date and time on the target point.

According to a thirteenth aspect of the present invention, a program causing a computer of a prediction model generation device (10) to function, the program causing the computer to execute: an observation start position specifying step of specifying an observation start position of a satellite from which a signal can be received at a reference point, a relative relationship value acquisition unit step of acquiring a relative relationship value between a position of the satellite and the observation start position of the satellite, an error measurement step of measuring a positional error at the reference point, and a prediction model generation step of generating a prediction model used for prediction of a positional error at a certain point, based on the relative relationship value and the positional error.

Advantageous Effects of Invention

According to the positional error prediction device, the prediction model generation device, the positional error prediction method, the prediction model generation method, and the program described above, it is possible to perform the positional error prediction with the influence of multipath taken into consideration.

BRIEF DESCRIPTION OF DRAWINGS

FIG. 5 is a diagram illustrating an example of reference point information according to the first embodiment.

DESCRIPTION OF EMBODIMENTS

First Embodiment

Hereinafter, a positional error prediction device and a prediction model generation device according to a first embodiment of the present invention will be described with reference to FIGS. 1 to 8.
(Function Configuration)

Figure 1:
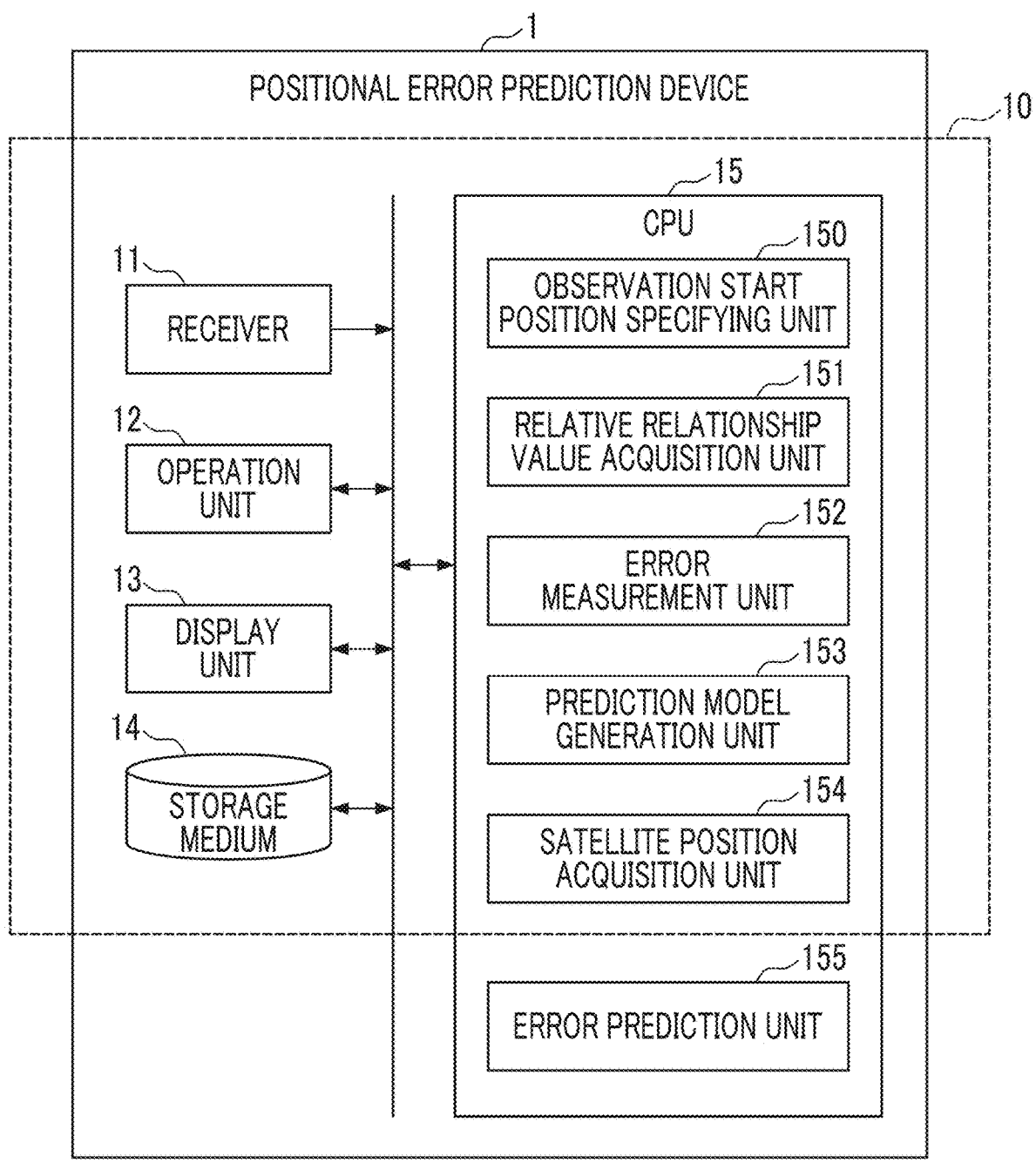
FIG. 1 is a diagram illustrating a functional configuration of a positional error prediction device and a prediction model generation device according to a first embodiment.

FIG. 1 is a diagram illustrating a functional configuration of a positional error prediction device and a prediction model generation device according to the first embodiment.

The positional error prediction device 1 according to the present embodiment is a device for predicting a positional error in a satellite positioning system. The positional error prediction device 1 is mounted on a vehicle (not illustrated) and predicts a positional error at a point where the vehicle is located.

In addition, in the following description, the point and the date and time in which the positional error prediction device 1 predicts the positional error are also referred to as "target point" and "target date and time", respectively.

The positional error prediction device 1 according to the present embodiment also functions as the prediction model generation device 10. The prediction model generation device 10 is installed at each of a plurality of preselected points (hereinafter, also referred to as "reference points"), collects data measured at the reference points for a long time (at least 24 hours or more), and generates a prediction model used for prediction of positional error. The prediction model generation device 10 may be mounted on a vehicle (not illustrated) and may measure and collect data by traveling around the reference point a plurality of times.

As illustrated in FIG. 1, the positional error prediction device 1 (prediction model generation device 10) includes a receiver 11, an operation unit 12, a display unit 13, a storage medium 14, and a CPU 15.

The receiver 11 receives a signal from a satellite every predetermined period.

The operation unit 12 is an input device such as a button, a touch panel, or a keyboard that receives user operations.

The display unit 13 is a display device such as a liquid crystal display or an organic EL display, and displays various data handled by the positional error prediction device 1 (prediction model generation device 10).

The storage medium 14 stores various data collected and generated by the positional error prediction device 1 (prediction model generation device 10).

The CPU 15 is a processor that controls the overall operation of the positional error prediction device 1 (prediction model generation device 10), and operates according to a predetermined program to function as an observation start position specifying unit 150, a relative relationship value acquisition unit 151, an error measurement unit 152, a prediction model generation unit 153, a satellite position acquisition unit 154, and an error prediction unit 155.

The observation start position specifying unit 150 specifies the observation start position of a satellite from which a signal can be received (hereinafter, also referred to as "observable satellite"), at a certain point (target point or reference point). Details of the observation start position will be described later.

The relative relationship value acquisition unit 151 acquires a relative relationship value between the position of the observable satellite and the observation start position of the observable satellite at a certain point (target point or reference point).

In the present embodiment, the relative relationship value acquisition unit 151 acquires, as the relative relationship value, the number of observable satellites located within a predetermined distance threshold from the observation start position of each of the plurality of observable satellites.

The error measurement unit 152 measures the positional error at the reference point.

The prediction model generation unit 153 generates a prediction model used for prediction of a positional error at a certain point, based on the relative relationship value and the positional error.

In the present embodiment, the prediction model generation unit 153 generates, as a prediction model, a correlation function between the number of observable satellites located within a predetermined distance threshold from the observation start position of each of the plurality of observable satellites and the positional error.

The satellite position acquisition unit 154 acquires the position of the observable satellite from which a signal can be received, at the target date and time on the target point at which a positional error prediction is performed.

Further, the satellite position acquisition unit 154 acquires the position of each observable satellite from which a signal can be received, at the reference point by date and time.

The error prediction unit 155 predicts a positional error at the target date and time on the target point, based on the relative relationship value and a positional error prediction model generated in advance.

Note that, as illustrated in FIG. 1, the prediction model generation device 10 according to the present embodiment may include at least a part of functional units (the observation start position specifying unit 150, the relative relationship value acquisition unit 151, the error measurement unit 152, the prediction model generation unit 153, and the satellite position acquisition unit 154) executed by the receiver 11, the operation unit 12, the display unit 13, the storage medium 14, and the CPU 15. Therefore, when the positional error prediction device 1 and the prediction model generation device 10 are implemented on different hardware in another embodiment, the error prediction unit 155 may be omitted from the CPU 15 of the prediction model generation device 10.

(Processing Flow of Prediction Model Generation Device)

Figure 2:
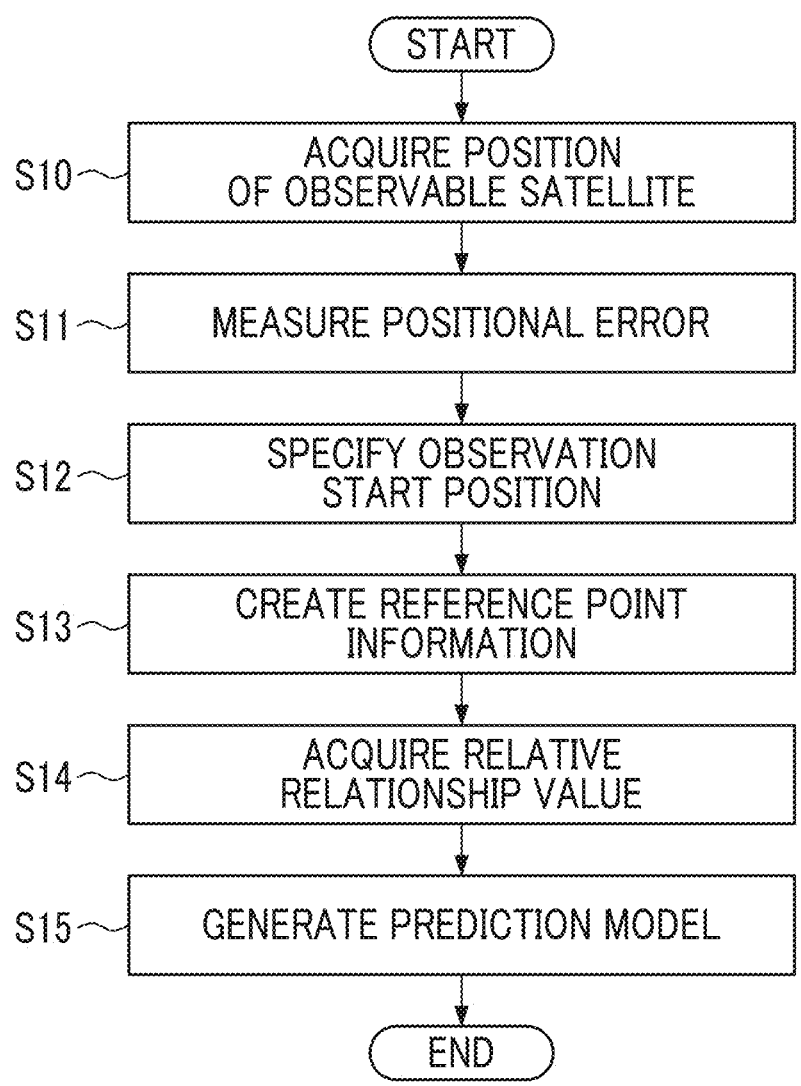
FIG. 2 is a flowchart illustrating an example of processing of the prediction model generation device according to the first embodiment.

FIG. 2 is a flowchart illustrating an example of processing of the prediction model generation device according to the first embodiment.

Figure 3:
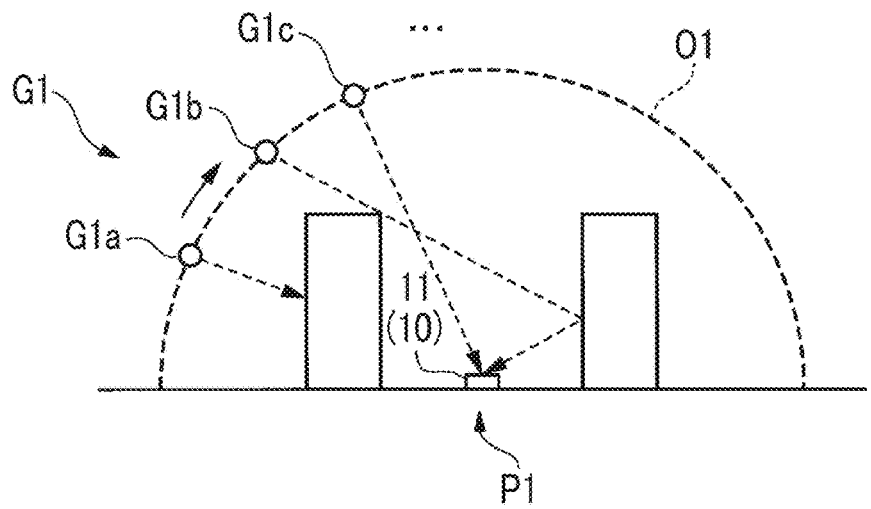
FIG. 3 is a first diagram for explaining an observation start position according to the first embodiment.

FIG. 3 is a first diagram for explaining an observation start position according to the first embodiment.

Figure 4:
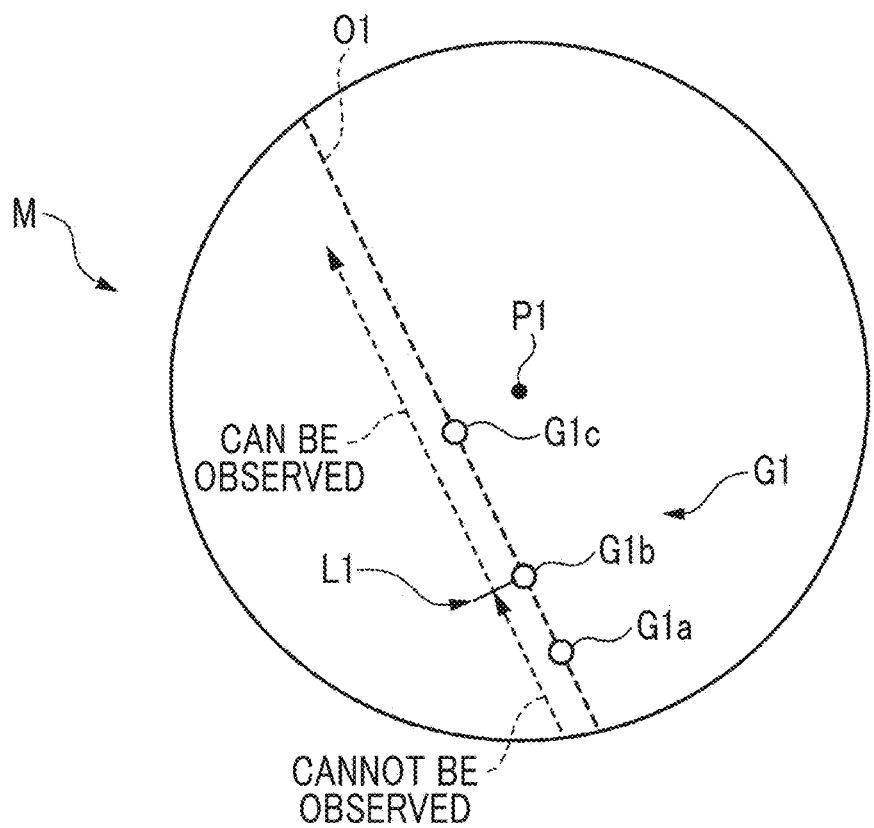
FIG. 4 is a second diagram for explaining an observation start position according to the first embodiment.

FIG. 4 is a second diagram for explaining the observation start position according to the first embodiment.

FIG. 5 is a diagram illustrating an example of reference point information according to the first embodiment.

Figure 6:
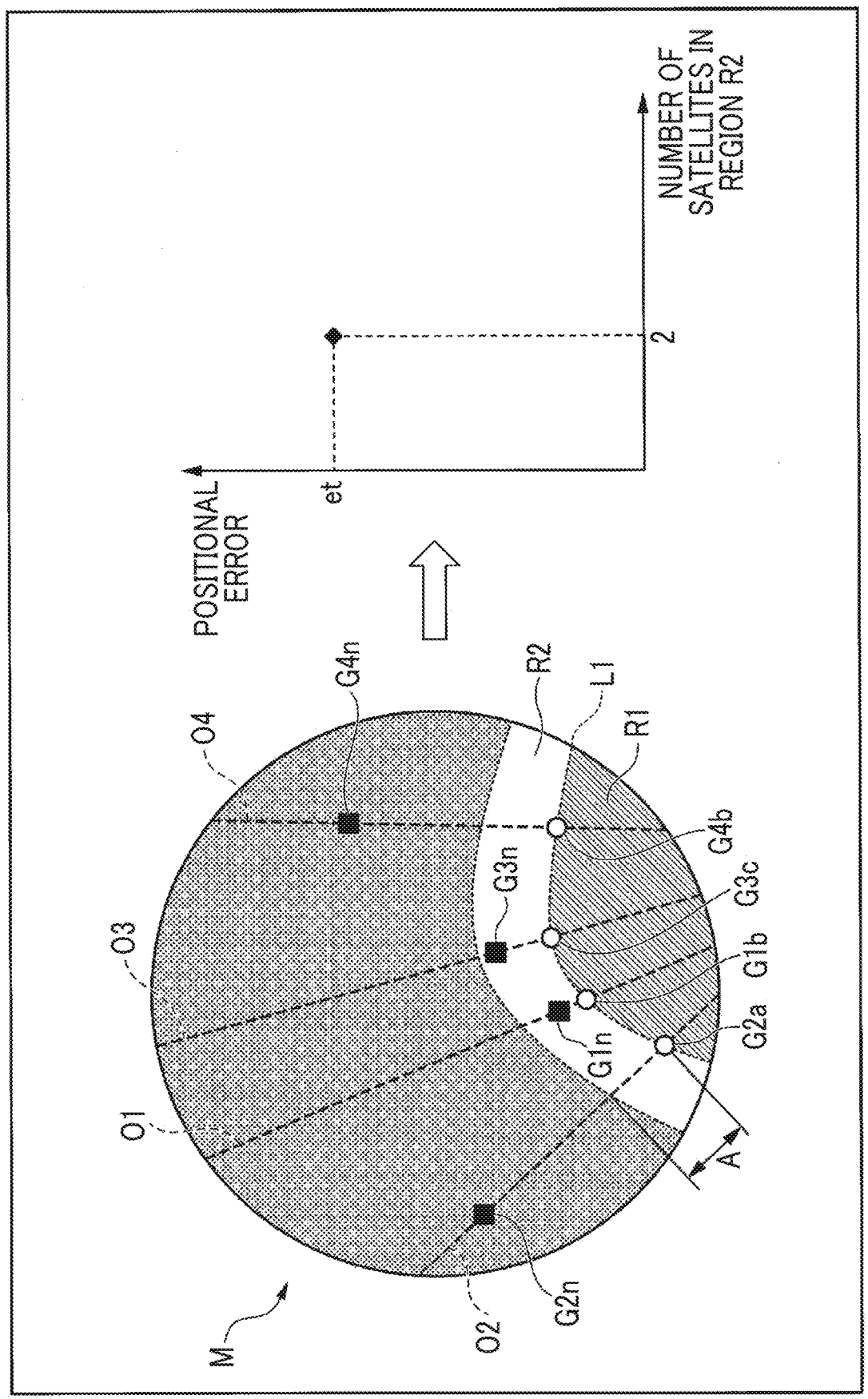
FIG. 6 is a diagram illustrating an example of a relative relationship value according to the first embodiment.

FIG. 6 is a diagram illustrating an example of the relative relationship value according to the first embodiment.

Figure 7:
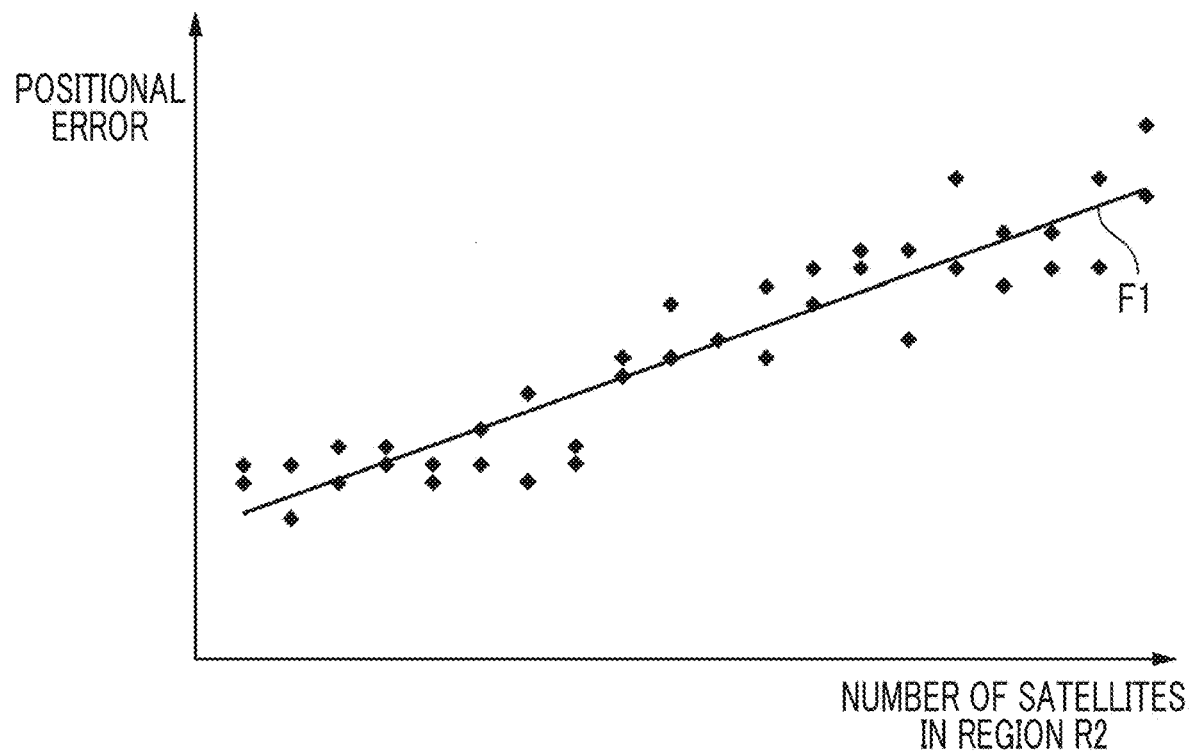
FIG. 7 is a diagram illustrating an example of a prediction model according to the first embodiment.

FIG. 7 is a diagram illustrating an example of the prediction model according to the first embodiment.

Hereinafter, an example of a process of generating the prediction model by the prediction model generation device 10 according to the present embodiment will be described with reference to FIGS. 2 to 7.

First, as illustrated in FIG. 2, the satellite position acquisition unit 154 of the prediction model generation device 10 acquires the position of each observable satellite, based on the signal received from the observable satellite, and stores and accumulates the acquired position in the storage medium 14 (step S10).

For example, as illustrated in FIG. 3, it is assumed that the prediction model generation device 10 is installed at the reference point P1. The satellite position acquisition unit 154 acquires and collects the positions of all observable satellites from which signals can be received at the reference point P1 every predetermined measurement time (for example, 5 minutes).

When a plurality of reference points are set, the satellite position acquisition unit 154 performs the same process for all the reference points.

Next, the error measurement unit 152 measures the positional error at the reference point P1 every predetermined measurement time, and stores and accumulates it in the storage medium 14 (step S11). The error measurement unit 152 measures the positional error in synchronization with the timing at which the satellite position acquisition unit 154 measures the position of each observable satellite.

Specifically, the error measurement unit 152 calculates the position of the reference point P1, based on the signals from the plurality of observable satellites received at each predetermined measurement time. Then, the error measurement unit 152 measures the positional error by comparing the accurate position of the reference point P1 stored in advance in the storage medium 14 with the calculated position.

When a plurality of reference points are set, the error measurement unit 152 performs the same process for all the reference points.

Next, the observation start position specifying unit 150 specifies the observation start position of the observable satellite at the reference point for each satellite (step S12).

As illustrated in FIG. 3, it is assumed that there is a satellite G1 that moves along an orbit O1 on a celestial sphere centered on the position (reference point P1) of the receiver 11 of the prediction model generation device 10. In the example of FIG. 3, when the satellite G1 is at a low position G1a on the orbit O1 (near the horizon), the signal from the satellite G1 is blocked by a shield (building or the like) around the reference point P1, and the receiver 11 is unable to receive this signal. When the satellite G1 reaches a certain position G1b on the celestial sphere, the receiver 11 can receive a signal avoiding the shield. At this time, the satellite G1 is observed by the receiver 11 as an observable satellite. Further, FIG. 4 illustrates a schematic diagram M in which the orbit O1 of the satellite G1 on the celestial sphere centering on the reference point P1 is illustrated on a plane. As illustrated in FIG. 4, the receiver 11 cannot receive a signal until the satellite G1 reaches the position G1b, so that the satellite G1 cannot be observed. After that, when the satellite G1 reaches the position G1b and the reception of the signal is started by the receiver 11, the prediction model generation device 10 starts the observation with the satellite G1 as an "observable satellite".

In this way, the observation start position specifying unit 150 specifies, as the observation start position L1 of the satellite G1, the position G1b on the celestial sphere of the satellite G1 at the time when the receiver 11 starts receiving the signal of the satellite G1. The observation start position specifying unit 150 specifies the observation start positions L1 of all observable satellites.

When a plurality of reference points are set, the observation start position specifying unit 150 performs the same process for all the reference points.

Further, returning to FIG. 2, the observation start position specifying unit 150 creates "reference point information N1

(FIG. 5)" in which the observation start position L1 of each observable satellite is recorded, and stores it in the storage medium 14 (step S13).

As illustrated in FIG. 5, the "observable satellite" at the reference point P1 and the "observation start position L1" of each observable satellite specified in step S12 are associated with the reference point information N1 and recorded.

When a plurality of reference points are set, the observation start position specifying unit 150 creates and stores the reference point information N1 of each reference point.

Next, returning to FIG. 2, the relative relationship value acquisition unit 151 counts the number of observable satellites located in a region within a predetermined distance threshold A (FIG. 6) from the observation start position L1 of each observable satellite, and acquires the counted number as a relative relationship value (step S14).

For example, as illustrated in FIG. 6, it is assumed that the orbits O1 to O4 of the satellites G1 to G4 are on the celestial sphere centered on the reference point P1. The region from the horizon (outer edge of the schematic diagram M) to the observation start position L1 (G1$b$, G2$a$, G3$c$, G4$b$) of each of the satellites G1 to G4 is an unobservable region R1 where the signal from the satellite is blocked by the shield and cannot be received. Further, in the region near the observation start position L1, there is a possibility that multipath may occur in which the signal from the satellite is reflected by the shield. Therefore, in the present embodiment, the relative relationship value acquisition unit 151 sets, as the multipath generation region R2, a region near the observation start position L1, that is, a region from the observation start position L1 of each satellite and the distance threshold A.

Further, FIG. 6 illustrates an example of the positions G1$n$ to G4$n$ of the observable satellites G1 to G2 at a certain time Tn, acquired by the satellite position acquisition unit 154 in step S10. In the example of FIG. 6, since two satellites, observable satellites G1 and G3, exist in the multipath generation region R2 at time Tn, the relative relationship value acquisition unit 151 acquires "the number of observable satellites in the multipath generation region R2=2", as the relative relationship value at time Tn.

The relative relationship value acquisition unit 151 similarly counts and acquires the number of observable satellites (relative relationship value) in the multipath generation region R2 at other times. In this manner, the relative relationship value acquisition unit 151 acquires the relative relationship value for each predetermined measurement time.

In addition, when a plurality of reference points are set, the relative relationship value acquisition unit 151 performs the same process for all the reference points.

Next, the prediction model generation unit 153 generates, as a prediction model, a correlation function between "the number of observable satellites (relative relationship value) located in the multipath generation region R2" for each predetermined measurement time acquired in step S14 and the positional error measured in step S11 (step S15).

For example, as illustrated in FIG. 6, the prediction model generation unit 153 sets "the number of observable satellites in the multipath generation region R2" as the horizontal axis and "positional error" as the vertical axis, and associates and plots "the number of satellites=2 at time Tn" with "positional error=et".

The prediction model generation unit 153 similarly plots the "number of satellites" and the "positional error" at all times to create a correlation diagram (scatter diagram) as illustrated in FIG. 7. When a plurality of reference points are set, the prediction model generation unit 153 collects and plots the "number of satellites" and the "positional error" at all the reference points in one correlation diagram.

Then, the prediction model generation unit 153 generate, as a prediction model, an approximation function F1 (correlation function) for calculating the "positional error" from the "number of observable satellites in the multipath generation region R2", based on the data plotted in the correlation diagram, as illustrated in FIG. 7. Further, the generated prediction model is stored in the storage medium 14.

(Processing Flow of Positional Error Prediction Device)

Figure 8:
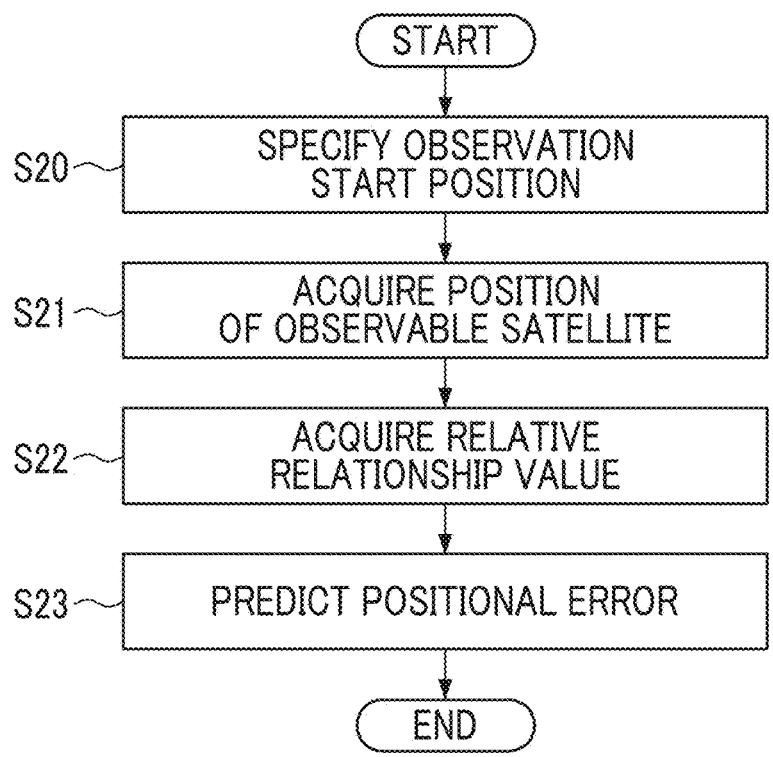
FIG. 8 is a flowchart illustrating an example of processing of the positional error prediction device according to the first embodiment.

FIG. 8 is a flowchart illustrating an example of processing of the positional error prediction device according to the first embodiment.

Hereinafter, an example of a process in which the positional error prediction device 1 predicts a positional error will be described with reference to FIG. 8.

First, as illustrated in FIG. 8, the observation start position specifying unit 150 of the positional error prediction device 1 specifies, for each satellite, the observation start position of the observable satellite at the target point for which the positional error is to be predicted (step S20).

At this time, it is assumed that the storage medium 14 of the positional error prediction device 1 stores logs of observable satellite signals received when the satellite has traveled a plurality of times near the target point in the past. Note that this log may not be recorded for a long period of time like the prediction model generation device 10. The observation start position specifying unit 150 specifies the observation start position of each observable satellite at the target point by performing the same process (step S12 in FIG. 2) as that of the prediction model generation device 10 by using these logs.

Next, the satellite position acquisition unit 154 acquires the position of the observable satellite at the target date and time on the target point at which the positional error prediction is performed (step S21).

Specifically, the satellite position acquisition unit 154 sets, as the target point, the current position of the vehicle equipped with the positional error prediction device 1, and sets the current date and time as the target date and time. In this case, the satellite position acquisition unit 154 acquires the position of each observable satellite, based on the signal received by the receiver 11 at the current time on the current position of the vehicle.

Next, the relative relationship value acquisition unit 151 acquires, as a relative relationship value, the number of observable satellites located within a predetermined distance threshold A from each observation start position L1 (within the multipath generation region R2), among the observable satellites at the target point (step S22).

Next, the error prediction unit 155 uses the prediction model (approximation function F1 in FIG. 7) stored in the storage medium 14 to predict the positional error from the number of observable satellites located in the multipath generation region R2 acquired in step S21 (step S23).

(Effects)

As described above, the positional error prediction device 1 according to the present embodiment includes a satellite position acquisition unit 154 that acquires a position of an observable satellite from which a signal can be received at target date and time on a target point at which a positional error prediction is performed, a relative relationship value acquisition unit 151 that acquires a relative relationship value between the position of the observable satellite and an observation start position L1 of the observable satellite at the target point, and an error prediction unit 155 that predicts a positional error at the target date and time on the target point, based on the relative relationship value and a positional error prediction model generated in advance.

For example, when there is a shield such as a building around the target point, the positional error prediction device 1 is able to receive a signal from the observable satellite, when the observable satellite reaches a position (that is, the observation start position L1) where the observable satellite is not completely shielded by the shield. However, in the vicinity of the observation start position L1, there is a possibility that a multipath may occur in which a reflected wave in which the signal from the observable satellite is reflected on a shield is received. Therefore, the positional error prediction device 1 according to the present embodiment predicts the positional error, based on the relative relationship value between the position of the observable satellite and the observation start position L1 of the observable satellite. Thus, the positional error prediction device 1 can perform the positional error prediction with the influence of multipath taken into consideration.

Further, the relative relationship value acquisition unit 151 acquires, as a relative relationship value, the number of observable satellites located within a predetermined distance threshold A from the observation start position L1 of each of the plurality of observable satellites (within the multipath generation region R2).

By doing so, the positional error prediction device 1 can predict the positional error with the influence of multipath near the observation start position L1 taken into consideration, based on the number of observable satellites located within the predetermined distance threshold A from the observation start position L1.

In addition, the prediction model generation device 10 according to the present embodiment includes an observation start position specifying unit 150 that specifies the observation start position L1 of an observable satellite from which a signal can be received at a reference point, a relative relationship value acquisition unit 151 that acquires a relative relationship value between the position of observable satellite and the observation start position L1 of the observable satellite, an error measurement unit 152 that measures a positional error at the reference point, and a prediction model generation unit 153 that generates a prediction model used for prediction of a positional error at a certain point, based on the relative relationship value and the positional error.

By doing so, the prediction model generation device 10 can generate a positional error prediction model with the influence of multipath near the observation start position L1 taken into consideration.

Further, the relative relationship value acquisition unit 151 acquires, as a relative relationship value, the number of observable satellites located within a predetermined distance threshold A from the observation start position L1 of each of the plurality of observable satellites (within the multipath generation region R2), and the prediction model generation unit 153 generates, as a prediction model, a correlation function (approximation function F1) between the number of observable satellites in the multipath generation region R2 and the positional error.

By doing so, the prediction model generation device 10 can generate a positional error prediction model with the influence of multipath near the observation start position L1 taken into consideration, based on the number of observable satellites located within the predetermined distance threshold A from the observation start position L1. Thereby, the prediction model generation device 10 can improve the prediction accuracy of the positional error.

In the present embodiment, the aspect has been described in which the relative relationship value acquisition unit 151 acquires, as the relative relationship value, the number (value A) of observable satellites located in the multipath generation region R2, but the present invention is not limited to this. In another embodiment, the relative relationship value acquisition unit 151 may acquire a value (value B) obtained by subtracting the number of observable satellites located in the multipath generation region R2 from the total number of observable satellites.

Further, in still another embodiment, the relative relationship value acquisition unit 151 may acquire, as the relative relationship value, the feature amount such as DOP at the reference position and the target position, in addition to the value A and the value B. At this time, the prediction model generation unit 153 may generate, as a prediction model, a predictor that receives the feature quantities such as the value A, the value B, and the DOP and outputs the positional error. Here, as the predictor, a commonly used multivariate regressor, random forest, neutral network, or the like is used.

The positional error may be represented by the time difference of the radius of the error circle.

Second Embodiment

Next, a positional error prediction device 1 and a prediction model generation device 10 according to a second embodiment of the present invention will be described with reference to FIGS. 9 to 11.

Constituent elements common to those of the first embodiment are denoted by the same reference numerals, and a detailed description thereof is omitted.

(Function Configuration)

Figure 9:
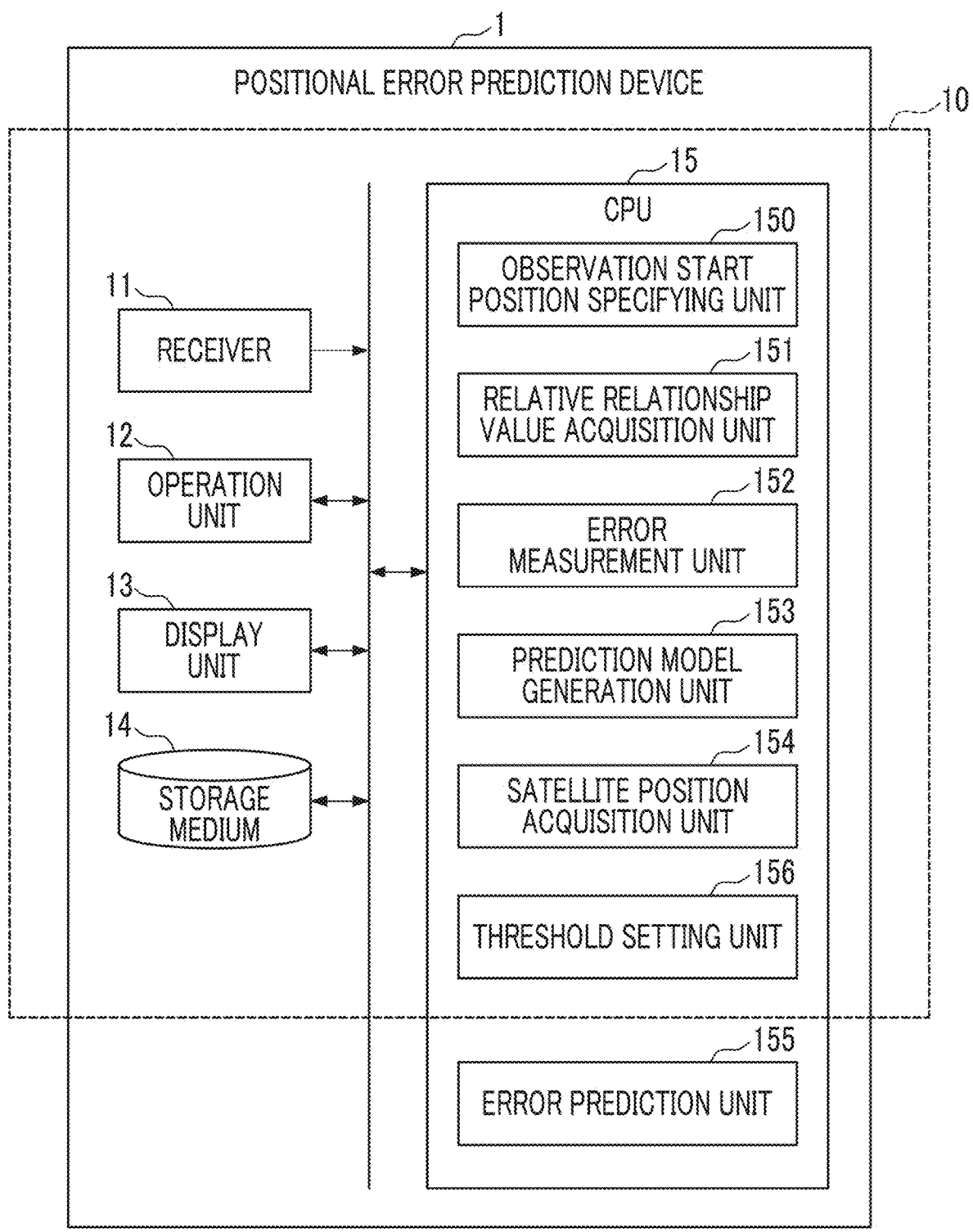
FIG. 9 is a diagram illustrating a functional configuration of a positional error prediction device and a prediction model generation device according to a second embodiment.

FIG. 9 is a diagram illustrating a functional configuration of a positional error prediction device and a prediction model generation device according to the second embodiment.

As illustrated in FIG. 9, the prediction model generation device 10 according to the present embodiment further includes a threshold setting unit 156.

The threshold setting unit 156 sets, as the distance threshold A, a distance at which the correlation function having a smallest residual variation is obtained, among the distances of the plurality of observable satellites from the observation start position L1.

(Processing Flow of Prediction Model Generation Device)

Figure 10:
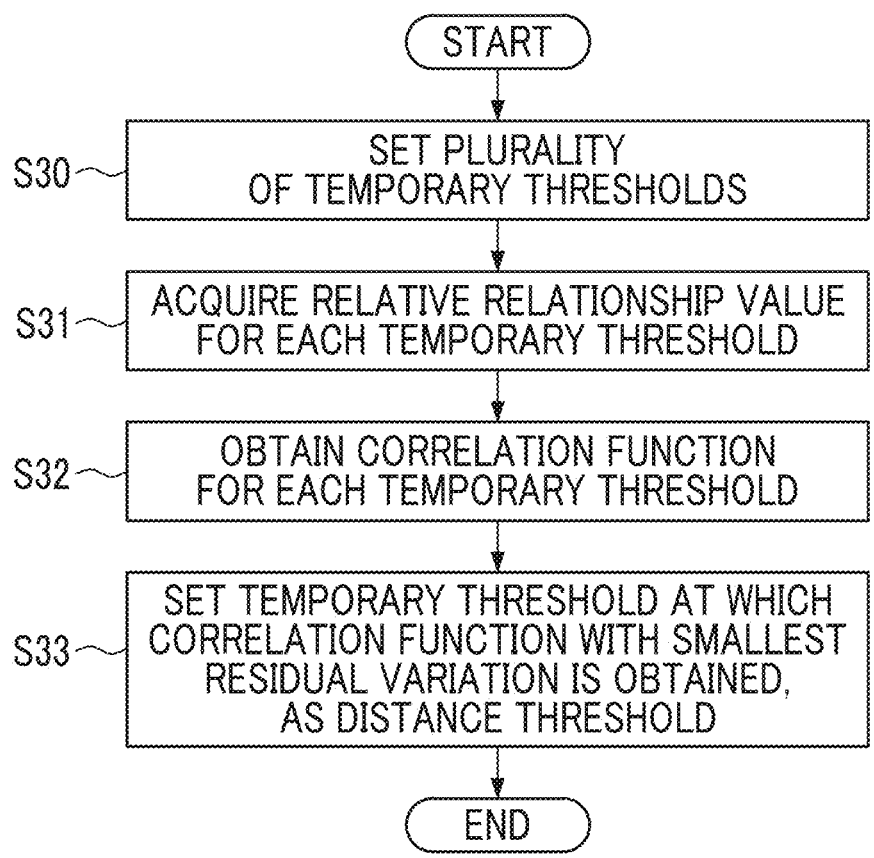
FIG. 10 is a flowchart illustrating an example of processing of the prediction model generation device according to the second embodiment.

FIG. 10 is a flowchart illustrating an example of processing of the prediction model generation device according to the second embodiment.

Figure 11:
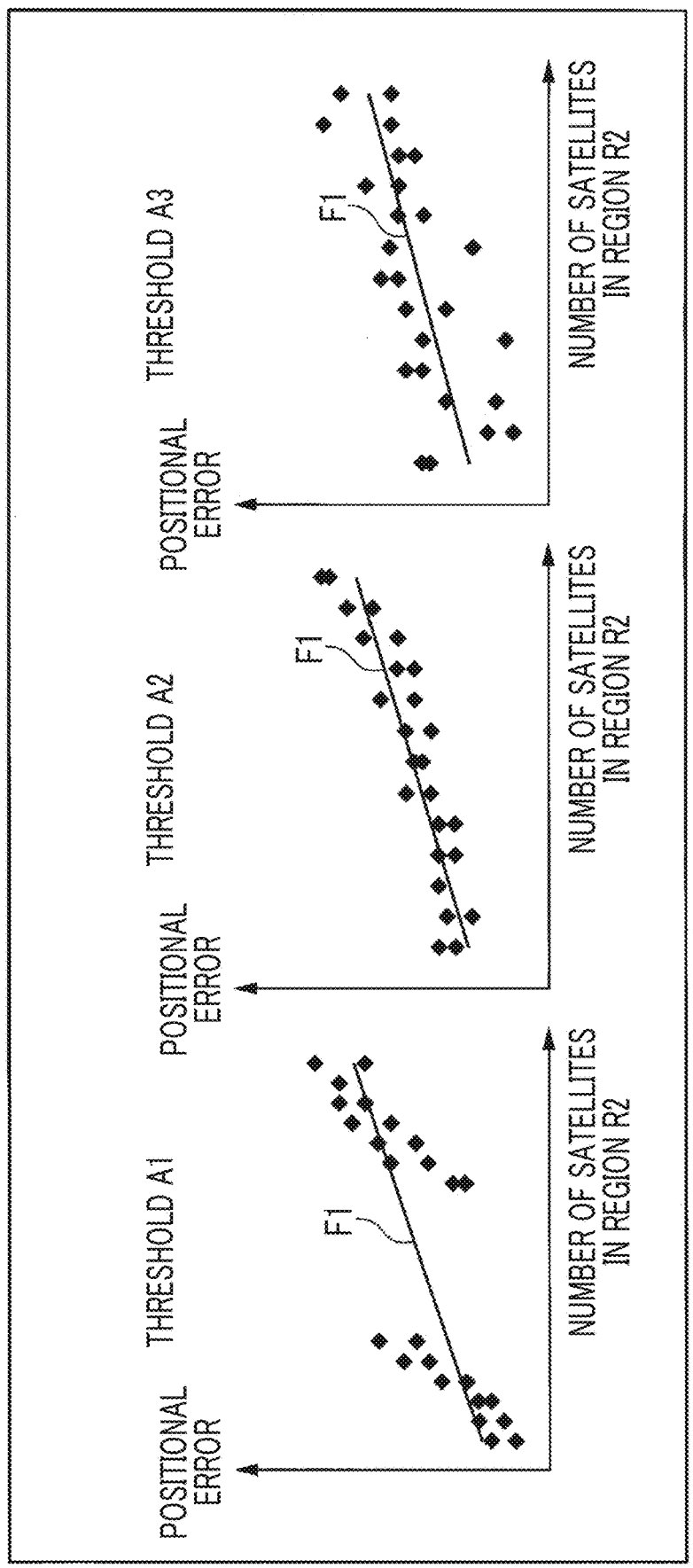
FIG. 11 is a diagram illustrating an example of a relative relationship value according to the second embodiment.

FIG. 11 is a diagram illustrating an example of the relative relationship value according to the second embodiment.

Hereinafter, an example of a process of generating the prediction model by the prediction model generation device 10 according to the present embodiment will be described with reference to FIGS. 10 and 11.

The prediction model generation device 10 according to the present embodiment executes the same process as steps S10 to S13 of FIG. 2 described in the first embodiment, and executes each process illustrated in FIG. 10, instead of steps S14 and S15 of FIG. 2. Here, only the process different from that of the first embodiment will be described.

First, the threshold setting unit 156 sets a plurality of different temporary thresholds, as candidates for the distance threshold A (step S30).

The temporary threshold indicates the distance of each observable satellite from each observation start position L1.

Here, an example in which the threshold setting unit 156 sets the temporary thresholds A1, A2, and A3 will be described, but the number of temporary thresholds is not particularly limited.

Next, the relative relationship value acquisition unit 151 acquires the relative relationship value for each temporary threshold (step S31).

Specifically, the relative relationship value acquisition unit 151 counts, for each measurement time, the number of observable satellites located within a region (multipath generation region R2) within the distance indicated by the temporary threshold A1 from the observation start position L1 of each observable satellite, and acquires the counted number of observable satellites as a relative relationship value for each measurement time at the temporary threshold A1. Similarly, the relative relationship value acquisition unit 151 acquires the relative relationship value for each measurement time at the temporary thresholds A2 and A3.

Next, the prediction model generation unit 153 generates a correlation function between the positional error measured in advance and the relative relationship value acquired in step S31, for each temporary threshold (step S32).

Specifically, as illustrated in FIG. 11, the prediction model generation unit 153 sets the "number of observable satellites in the multipath generation region R2" as the horizontal axis and the "positional error" as the vertical axis, and a correlation diagram in which the data is plotted, for each temporary threshold.

Further, the prediction model generation unit 153 obtains, for each temporary threshold, an approximation function F1 (correlation function) for calculating the "positional error" from the "number of observable satellites in the multipath generation region R2", based on the points plotted in the correlation diagram.

Next, the threshold setting unit 156 sets, as the distance threshold A, a temporary threshold at which the approximation function F1 with the smallest residual variation is obtained, among the plurality of approximation functions F1 generated by the prediction model generation unit 153 (step S33).

In the example of FIG. 11, when the temporary threshold is A2, the residual variation (for example, residual sum of squares) of the approximation function F1 is minimum. Therefore, in the example of FIG. 11, the threshold setting unit 156 sets the temporary threshold A2 as the distance threshold A.

The distance threshold A (temporary threshold A2 in the example of FIG. 11) set by the threshold setting unit 156 is used when the positional error prediction device 1 predicts the positional error. Specifically, in step S22 of FIG. 2, the relative relationship value acquisition unit 151 of the positional error prediction device 1 acquires, as a relative relationship value, the number of observable satellites located within the distance threshold A (temporary threshold A2) from each observation start position L1, among the observable satellites at the target point.

(Effects)

As described above, the prediction model generation device 10 according to the present embodiment further includes a threshold setting unit 156 that sets, as the distance threshold A, a distance (threshold) at which the approximation function F1 having a smallest residual variation is obtained, among the distances (temporary thresholds A1 to A3) of the plurality of observable satellites from the observation start position L1.

By doing so, the prediction model generation device 10 generates a prediction model by setting the distance threshold that makes the correlation between the positional error and the number of satellites located in the multipath generation region R2 strong, thereby further improving the prediction accuracy of the positional error.

Third Embodiment

Next, a positional error prediction device 1 and a prediction model generation device 10 according to a third embodiment of the present invention will be described with reference to FIG. 12.

The components common to those of the above-described respective embodiments are denoted by the same reference numerals, and a detailed description thereof is omitted.

In the present embodiment, the function of the threshold setting unit 156 of the prediction model generation device 10 is different from that of the second embodiment.

The threshold setting unit 156 according to the present embodiment measures a pseudo distance between the reference point and the observable satellite, and sets, as the distance threshold for each satellite, a distance from the observation start position L1 of the observable satellite to the position of the observable satellite when the pseudo distance has changed by a predetermined amount or more.

Figure 12:
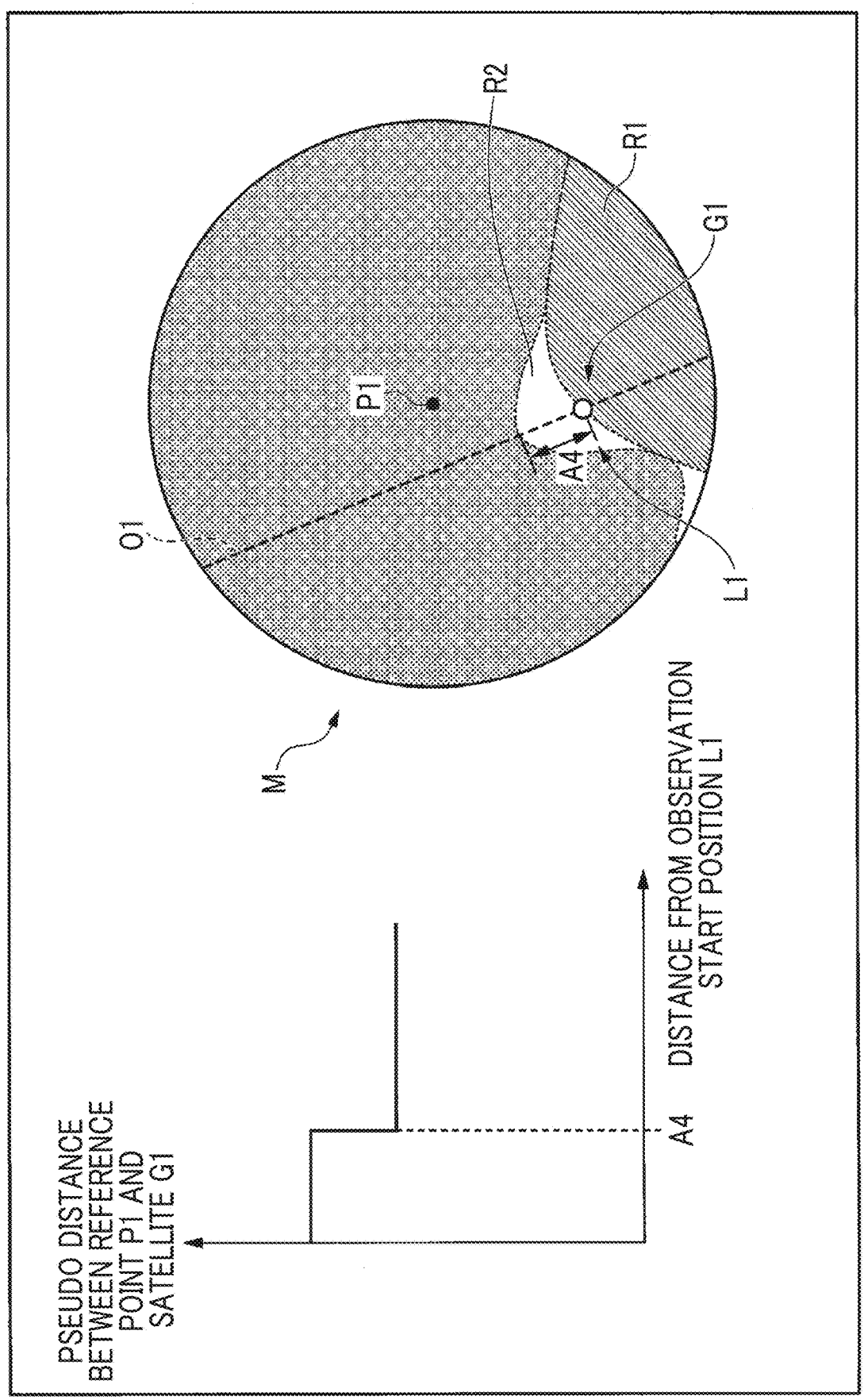
FIG. 12 is a diagram illustrating an example of a distance threshold according to a third embodiment.

FIG. 12 is a diagram illustrating an example of the distance threshold according to the third embodiment.

For example, as illustrated in FIG. 12, the threshold setting unit 156 sequentially measures the pseudo distance between the reference point P1 and the observable satellite G1 after the observable satellite G1 reaches the observation start position L1. In the example of FIG. 12, when the observable satellite G1 moves to a position away from the observation start position L1 by a distance A4, the pseudo distance sharply decreases. This is because it is considered that the receiver 11 receives the reflected wave of the signal of the observable satellite G1 up to the position of the distance A4 due to the influence of the multipath, and can receive a direct wave at the position of the distance A4 or more due to the cancel of the multipath.

Therefore, the threshold setting unit 156 according to the present embodiment sets this distance A4 as a distance threshold indicating the maximum value of the multipath generation region R2 of the observable satellite G1.

In addition, when there is another observable satellite at the reference point P1, the threshold setting unit 156 performs similar processing and sets a distance threshold for each satellite.

The distance threshold for each satellite set by the threshold setting unit 156 is also used when the positional error prediction device 1 predicts a positional error.

Specifically, when acquiring the relative relationship value in step S22 of FIG. 2, the relative relationship value acquisition unit 151 of the positional error prediction device 1 uses, as the predetermined distance threshold A, the maximum value among the distance thresholds for respective satellites set by the threshold setting unit 156. For example, when the distance A4 of the observable satellite G1 is the maximum value among the distance thresholds for respective satellites, the relative relationship value acquisition unit 151 acquires, as a relative relationship value, the number of observable satellites located within the distance threshold A (distance A4) from the observation start position L1 of each observable satellite. By setting the distance threshold A in this way, the positional error prediction device 1 can predict the upper limit of the positional error at the target point.

Further, when it is desired to improve the prediction accuracy of the positional error, the relative relationship value acquisition unit 151 may use the average value of the distance thresholds of respective satellites set by the threshold setting unit 156 as the predetermined distance threshold A.

The prediction model generation device 10 according to the present embodiment having the above-described configuration can set the distance threshold A, by determining how far multipath affects from the observation start position, for each satellite, based on the change in the pseudo distance. Thereby, the prediction model generation device can further improve the prediction accuracy of the positional error.

In addition, in the present embodiment, the example has been described in which the threshold setting unit 156 sets, as the distance threshold A, the position of the satellite when the pseudo distance sharply decreases (changes by a predetermined amount or more), but the present invention is not limited to this.

In another embodiment, the threshold setting unit 156 may sequentially measure the signal strength instead of the pseudo distance, and set, as the distance threshold for each satellite, the position of the satellite when the signal strength of each satellite sharply changes (increases).

Fourth Embodiment

Next, a positional error prediction device 1 and a prediction model generation device 10 according to a fourth embodiment of the present invention will be described with reference to FIGS. 13 and 14.

The components common to those of the above-described respective embodiments are denoted by the same reference numerals, and a detailed description thereof is omitted.

In the present embodiment, the functions of the relative relationship value acquisition unit 151, the prediction model generation unit 153, and the threshold setting unit 156 of the positional error prediction device 1 (prediction model generation device 10) are different from those of the above-described embodiments.

The relative relationship value acquisition unit 151 according to the present embodiment acquires, as a relative relationship value, the separation distance from the observation start position L1 for the observable satellite closest to the observation start position L1, among the plurality of observable satellites.

Figure 13:
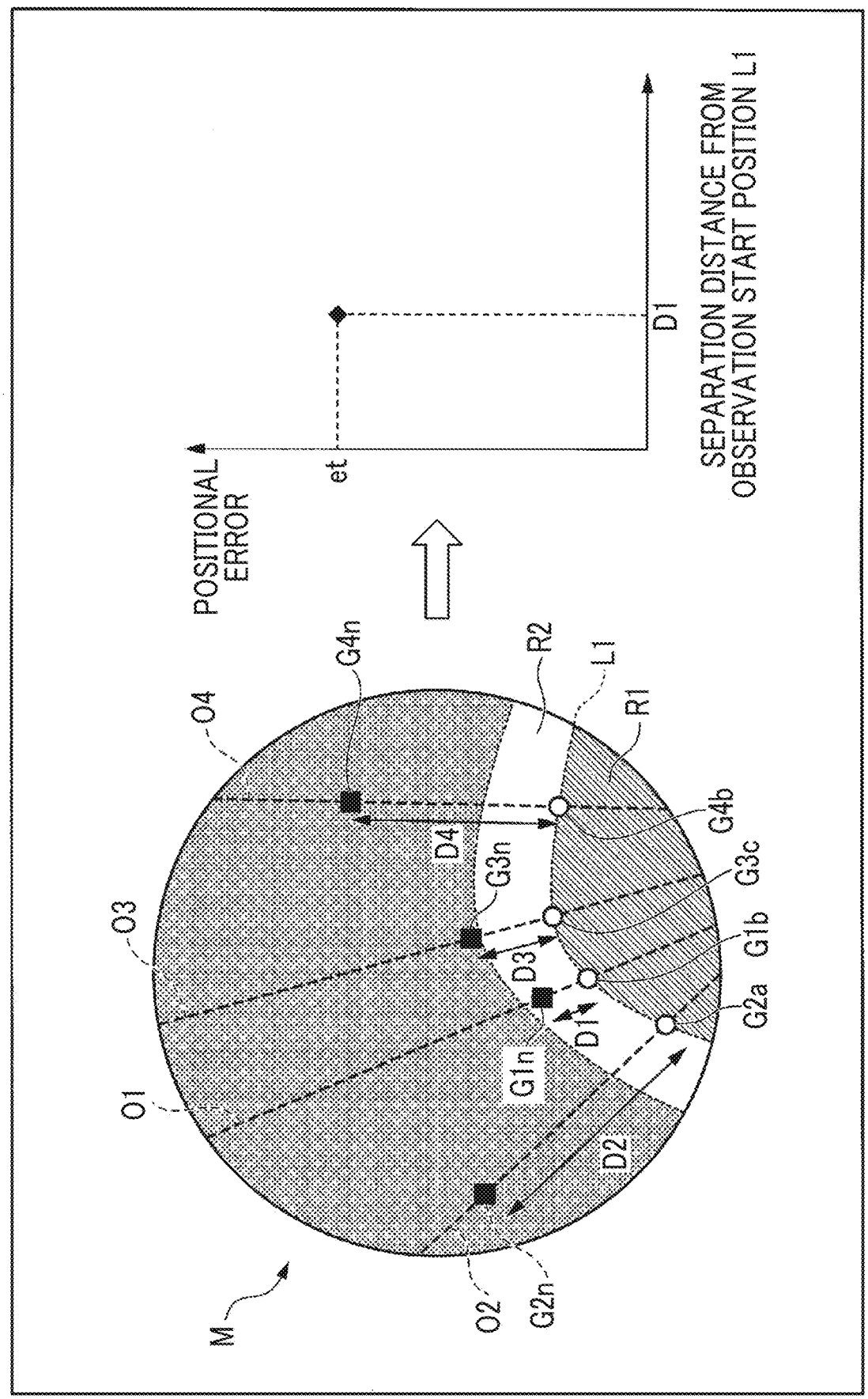
FIG. 13 is a diagram illustrating an example of a relative relationship value according to a fourth embodiment.

FIG. 13 is a diagram illustrating an example of the relative relationship value according to the fourth embodiment.

For example, as illustrated in FIG. 13, it is assumed that the orbits O1 to O4 of the satellites G1 to G4 are on the celestial sphere centered on the reference point P1. Further, it is assumed that the positions of the satellites G1 to G4 at a certain time Tn are G1n to G4n, respectively.

When acquiring the relative relationship value at time Tn, the relative relationship value acquisition unit 151 calculates the separation distance D1 from the observation start position L1 (G1b) of the observable satellite G1, the separation distance D2 from the observation start position L1 (G2a) of the observable satellite G2, the separation distance D3 from the observation start position L1 (G3c) of the observable satellite G3, and the separation distance D4 from the observation start position L1 (G4b) of the observable satellite G4, respectively. Then, the relative relationship value acquisition unit 151 acquires, as the relative relationship value, the shortest distance (minimum separation distance) among the separation distances D1 to D4. In the example of FIG. 13, since the separation distance D1 of the observable satellite G1 is the shortest, the relative relationship value acquisition unit 151 acquires the separation distance D1 as the relative relationship value.

The relative relationship value acquisition unit 151 similarly acquires relative relationship values at other times. In this way, the relative relationship value acquisition unit 151 acquires the minimum separation distance (relative relationship value) for each predetermined measurement time.

Further, the prediction model generation unit 153 according to the present embodiment generates a prediction model showing the correlation between the separation distance acquired as the relative relationship value and the positional error.

Figure 14:
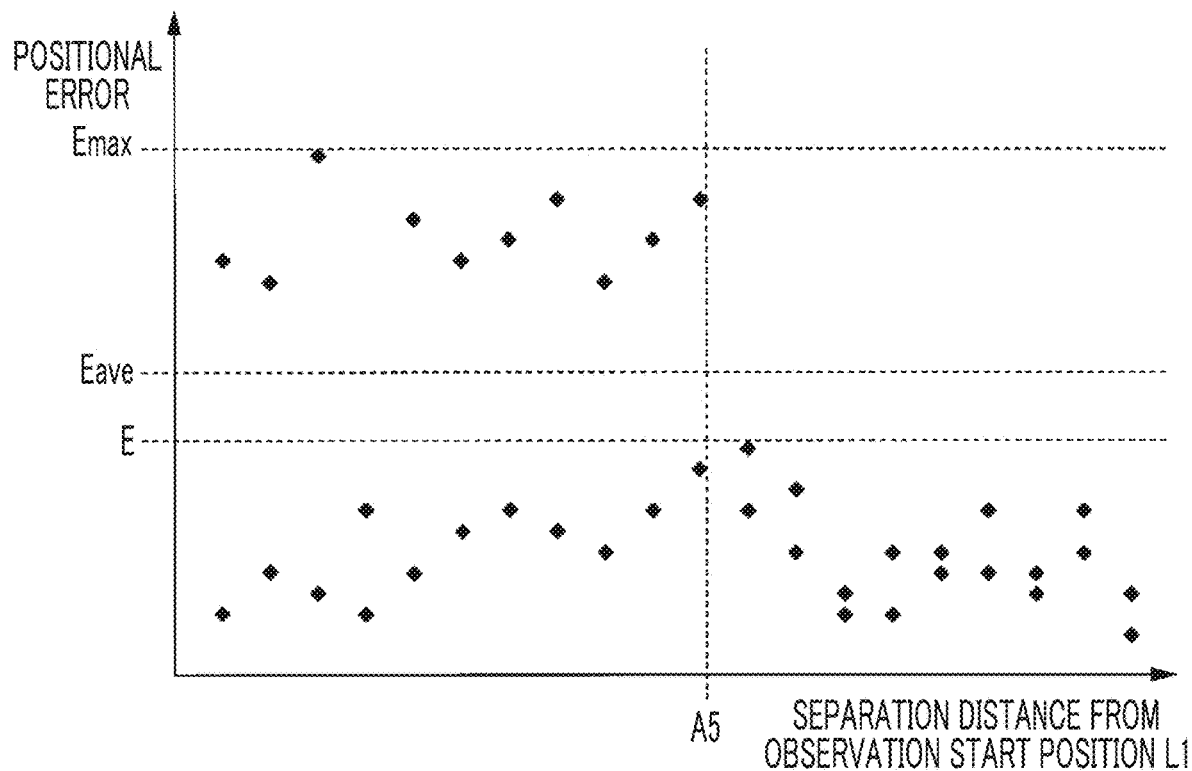
FIG. 14 is a diagram illustrating an example of a prediction model according to the fourth embodiment.

FIG. 14 is a diagram illustrating an example of the prediction model according to the fourth embodiment.

Specifically, as illustrated in FIG. 13, the prediction model generation unit 153 sets the "separation distance from the observation start position L1" as the horizontal axis and the "positional error" as the vertical axis, and associates and plots "separation distance=D1" at time Tn with "positional error=et".

The prediction model generation unit 153 similarly plots the "separation distance" and the "positional error" at all times to create a correlation diagram (scatter diagram) as illustrated in FIG. 14. When a plurality of reference points are set, the prediction model generation unit 153 collectively plots the "separation distance" and the "positional error" at all the reference points in one correlation diagram.

In addition, as illustrated in FIG. 14, the threshold setting unit 156 according to the present embodiment sets, as the distance threshold, the distance A5 having the smallest "separation distance from the observation start position L1", among the data whose positional error is equal to or less than the predetermined error threshold E, based on the data plotted in the correlation diagram.

Then, the prediction model generation unit 153 generates, as a prediction model, a correlation function between the positional error and the separation distance that is equal to or smaller than the distance threshold A5 set by the threshold setting unit 156.

For example, the prediction model generation unit 153 obtains the average value Eave and the maximum value Emax of the positional errors measured when the "separation distance from the observation start position L1" is equal to or less than the distance threshold A5. Then, when at the target point to be predicted, the separation distance from the observation start position of the observable satellite closest to the observation start position L1 of each observable satellite is the distance threshold A5 or less, the prediction model generation unit 153 generates a correlation function that outputs the maximum value Emax as a prediction model. The prediction model generation unit 153 may generate, as the prediction model, a correlation function that outputs the average value Eave instead of the maximum value Emax.

Further, the generated prediction model is stored in the storage medium 14.

As described above, in the prediction model generation device 10 according to the present embodiment, the relative relationship value acquisition unit 151 acquires, as the relative relationship value, a separation distance of each of the plurality of observable satellites from the observation start position L1 of the observable satellite closest to the observation start position L1, and the prediction model generation unit 153 generates a prediction model indicating the correlation between the separation distance from the observation start position L1 and the positional error.

By doing so, the prediction model generation device 10 can generate a positional error prediction model with the influence of multipath near the observation start position L1 taken into consideration, based on the separation distance from the observation start position L1 of the observable satellite closest to the observation start position L1. Thereby, the prediction model generation device 10 can improve the prediction accuracy of the positional error.

Further, the threshold setting unit 156 according to the present embodiment sets, as a distance threshold, a smallest separation distance, among the separation distances having the positional error being equal to or less than a predetermined error threshold E, and the prediction model generation unit (153) generates, as the prediction model, a correlation function between the separation distance that is equal to or less than the distance threshold and the maximum value Emax of the positional error measured when the distance is equal to or less than the distance threshold.

By doing so, the prediction model generation device 10 can set a distance threshold by deriving how far (separation distance) multipath affects from the observation start position L1, based on the correlation between the positional error and the separation distance. Further, it is possible to accurately predict the maximum positional error that will occur in the multipath generation region R2, by generating, as a prediction model, a correlation function with the maximum value Emax of the positional error measured when the distance is equal to or less than the distance threshold.

(Hardware Configuration)

Figure 15:
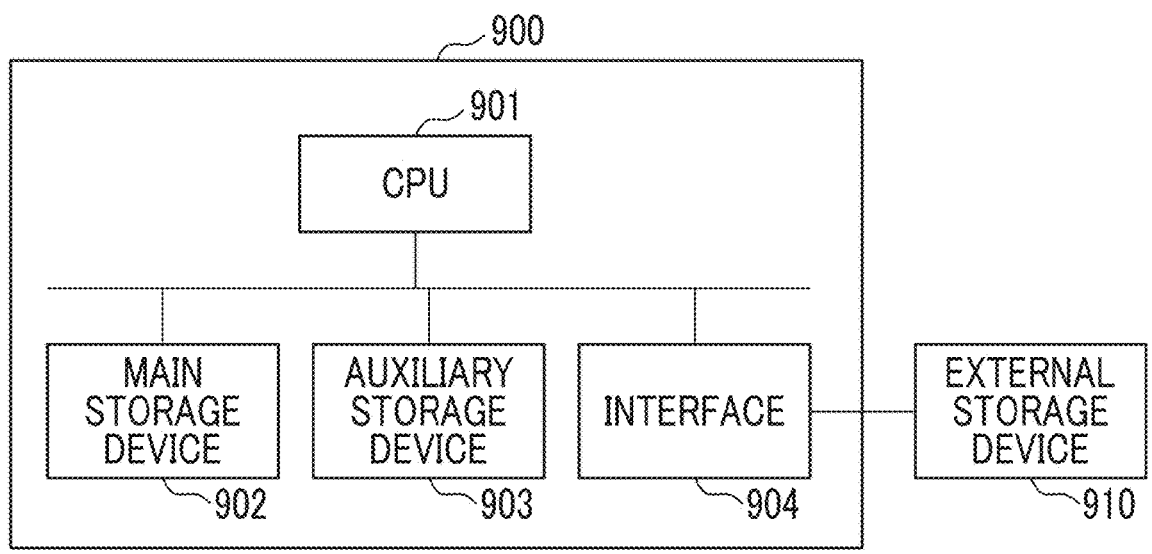
FIG. 15 is a diagram illustrating an example of a hardware configuration of a positional error prediction device and a prediction model generation device according to at least one embodiment.

FIG. 15 is a diagram illustrating an example of a hardware configuration of the positional error prediction device and the prediction model generation device according to at least one embodiment.

Hereinafter, an example of the hardware configuration of the positional error prediction device 1 and the prediction model generation device 10 according to at least one embodiment described above will be described with reference to FIG. 15.

As illustrated in FIG. 15, the computer 900 includes a CPU 901, a main storage device 902, an auxiliary storage device 903, and an interface 904.

The positional error prediction device 1 and the prediction model generation device 10 described above are implemented in the computer 900. The operation of each of the above-described processing units is stored in the auxiliary storage device 903 in the form of a program. The CPU 901 reads the program from the auxiliary storage device 903, develops the program into the main storage device 902, and executes the above process according to the program. Further, the CPU 901 secures a storage region used by the positional error prediction device 1 and the prediction model generation device 10 for various processes in the main storage device 902 according to the program. Further, the CPU 901 secures a storage region (storage medium 14) for storing data being processed in the auxiliary storage device 903 according to the program.

Examples of the auxiliary storage device 903 include a hard disk drive (HDD), a solid state drive (SSD), a magnetic disk, a magneto-optical disk, a compact disc read only memory (CD-ROM), a digital versatile disc read only memory (DVD-ROM), and a semiconductor memory. The auxiliary storage device 903 may be an internal medium directly connected to the bus of the computer 900, or may be an external medium connected to the computer 900 through the interface 904 or a communication line. Further, when this program is delivered to the computer 900 through a communication line, the computer 900 receiving the delivered program may develop the program in the main storage device 902 and execute the above process. In at least one embodiment, the auxiliary storage device 903 is a non-transitory tangible storage medium.

Further, the program may be for realizing a part of the above-described functions.

Further, the program may be a so-called differential file (differential program) which realizes the above-described function in combination with other programs already stored in the auxiliary storage device 903.

Although the embodiment of the present invention has been described in detail above, the present invention is not limited to these as long as it does not deviate from the technical idea of the present invention, and some design change and the like are also possible.

For example, in each of the above-described embodiments, the aspect in which the positional error prediction device 1 and the prediction model generation device 10 are implemented on one computer has been described, but the present invention is not limited to this. In another embodiment, the positional error prediction device 1 and the prediction model generation device 10 may be implemented on different computers.

INDUSTRIAL APPLICABILITY

According to the positional error prediction device, the prediction model generation device, the positional error prediction method, the prediction model generation method, and the program described above, it is possible to perform the positional error prediction with the influence of multipath taken into consideration.

REFERENCE SIGNS LIST

1 Positional error prediction device
10 Prediction model generation device
11 Receiver
12 Operation unit
13 Display unit
14 Storage medium
15 CPU
150 Observation start position specifying unit
151 Relative relationship value acquisition unit
152 Error measurement unit
153 Prediction model generation unit
154 Satellite position acquisition unit
155 Error prediction unit
156 Threshold setting unit

The invention claimed is:

1. A positional error prediction device comprising:
a satellite position acquisition unit that acquires a position of a satellite from which a signal can be received, at target date and time on a target point at which a positional error prediction is performed;
a relative relationship value acquisition unit that acquires a relative relationship value between the position of the satellite and an observation start position of the satellite at the target point, wherein the observation start position of the satellite is a position at which a reception of the signal from the satellite is firstly started at the target point; and an error prediction unit that predicts a positional error at the target date and time on the target point, based on the relative relationship value and a positional error prediction model generated in advance,
wherein the relative relationship value acquisition unit acquires the relative relationship value based on a multipath generation region, wherein the multipath generation region is defined as a partial region in an orbit of the satellite by a predetermined distance threshold from the observation start position in a region from the observation start position to a zenith of a celestial sphere centered on the target point.

2. The positional error prediction device according to claim 1,
wherein the relative relationship value acquisition unit acquires, as the relative relationship value, the number of the satellites located within the multipath generation range.

3. The positional error prediction device according to claim 1,
wherein the relative relationship value acquisition unit acquires, as the relative relationship value, a separation distance from the observation start position with respect to the satellite closest to the observation start position, among the plurality of satellites.

4. A prediction model generation device comprising:
an observation start position specifying unit that specifies an observation start position of a satellite from which a signal can be received, at a reference point, wherein the observation start position of the satellite is a position at which a reception of the signal from the satellite is firstly started at the reference point;
a relative relationship value acquisition unit that acquires a relative relationship value between a position of the satellite and the observation start position of the satellite;
an error measurement unit that measures a positional error at the reference point; and
a prediction model generation unit that generates a prediction model used for prediction of a positional error at a certain point, based on the relative relationship value and the positional error,
wherein the relative relationship value acquisition unit acquires the relative relationship value based on a multipath generation region, wherein the multipath generation region is defined as a partial region in an orbit of the satellite by a predetermined distance threshold from the observation start position in a region from the observation start position to a zenith of a celestial sphere centered on the target point.

5. The prediction model generation device according to claim 4,
wherein the relative relationship value acquisition unit acquires, as the relative relationship value, the number of the satellites located within the multipath generation region, and
wherein the prediction model generation unit generates, as the prediction model, a correlation function between the number of the satellites and the positional error.

6. The prediction model generation device according to claim 5, further comprising:
a threshold setting unit that sets, as the predetermined distance threshold, a distance at which the correlation function having a smallest residual variation is obtained, among distances from the observation start position of the plurality of satellites, the distances each of which is shorter than a distance between the observation start position and the zenith.

7. The prediction model generation device according to claim 5, further comprising:
a threshold setting unit that measures a pseudo distance between the reference point and the satellite, and sets, as the predetermined distance threshold for each satellite, a distance from the observation start position of the satellite to the position of the satellite when the pseudo distance has changed by a predetermined amount or more.

8. The prediction model generation device according to claim 4,
wherein the relative relationship value acquisition unit acquires, as the relative relationship value, a separation distance of each of the plurality of satellites from the observation start position of the satellite closest to the observation start position, and
wherein the prediction model generation unit generates the prediction model indicating a correlation between the separation distance and the positional error.

9. The prediction model generation device according to claim 8, further comprising:
a threshold setting unit that sets, as the predetermined distance threshold, a separation distance which is smallest among the separation distances having the positional error being equal to or less than a predetermined error threshold,
wherein the prediction model generation unit generates, as the prediction model, a correlation function between the separation distance that is equal to or less than the predetermined distance threshold and a maximum value of the positional error measured when the separation distance is equal to or less than the predetermined distance threshold.

10. A positional error prediction method comprising:
a satellite position acquisition step of acquiring a position of a satellite from which a signal can be received, at target date and time on a target point at which a positional error prediction is performed;
a relative relationship value acquisition step of acquiring a relative relationship value between the position of the satellite and an observation start position of the satellite at the target point, wherein the observation start position of the satellite is a position at which a reception of the signal from the satellite is firstly started at the target point; and
an error prediction step of predicting, based on the relative relationship value and a positional error prediction model generated in advance, a positional error at the target date and time on the target point,
wherein in the relative relationship value acquisition step, the relative relationship value is acquired based on a multipath generation region, wherein the multipath generation region is defined as a partial region in an orbit of the satellite by a distance threshold from the observation start position in a region from the observation start position to a zenith of a celestial sphere centered on the target point.

11. The positional error prediction device according to claim 1,
wherein the positional error prediction model is a correlation function between a positional error of a reference point in which a correct position is previously known and a relative relationship value with respect to the reference point, the positional error obtained by comparing the correct position of the reference point and an estimated position of the reference point estimated by the signal received from the satellite, and the predetermined distance threshold is a distance at which the correlation function having a smallest residual variation is obtained among distances from the observation start position of the plurality of satellites, the distances each of which is shorter than a distance between the observation start position and the zenith.

12. The positional error prediction method according to claim 10, wherein the positional error prediction model is a correlation function between a positional error of a reference point in which a correct position is previously known and a relative relationship value with respect to the reference point, the positional error obtained by comparing the correct position of the reference point and an estimated position of the reference point estimated by the signal received from the satellite, and the predetermined distance threshold is a distance at which the correlation function having a smallest residual variation is obtained among distances from the observation start position of the plurality of satellites, the distances each of which is shorter than a distance between the observation start position and the zenith.

* * * * *